US 7,466,802 B2

(12) United States Patent
Lew et al.

(10) Patent No.: US 7,466,802 B2
(45) Date of Patent: *Dec. 16, 2008

(54) SYSTEM AND METHOD FOR PROVIDING VISUAL INDICATION OF CALLER AND TELEPHONY PLATFORM INFORMATION ON CUSTOMER PREMISES EQUIPMENT

(75) Inventors: Gavin Sueo Lew, Bartlett, IL (US); Thomas Steven Woods, Niles, IL (US); Paul H. Vlasek, Brookfield, IL (US); Crystal Roney, River Forest, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/136,302

(22) Filed: May 24, 2005

(65) Prior Publication Data

US 2005/0281394 A1 Dec. 22, 2005

Related U.S. Application Data

(63) Continuation of application No. 10/180,421, filed on Jun. 26, 2002, now Pat. No. 7,020,250, which is a continuation of application No. 09/151,860, filed on Sep. 11, 1998, now Pat. No. 6,483,898.

(51) Int. Cl.
*H04M 1/64* (2006.01)

(52) U.S. Cl. ............... 379/88.12; 379/88.19; 379/88.2; 379/93.35; 379/142.01; 379/142.04; 379/215.01

(58) Field of Classification Search ............ 379/142.07, 379/265.09, 201.07, 212.01, 230, 88.12, 379/265.03, 88.11, 88.19, 88.2, 88.21, 93.35, 379/142.01, 142.04, 142.08, 142.1, 144.07, 379/215.01; 455/412.1–413, 415
See application file for complete search history.

(56) References Cited

U.S. PATENT DOCUMENTS

| 4,924,496 | A | | 5/1990 | Figa et al. |
| 5,325,421 | A | | 6/1994 | Hou et al. |
| 5,436,966 | A | * | 7/1995 | Barrett et al. .......... 379/265.03 |
| 5,467,385 | A | | 11/1995 | Reuben et al. |
| 5,546,447 | A | | 8/1996 | Skarbo et al. |
| 5,568,540 | A | | 10/1996 | Greco et al. |
| 5,572,576 | A | | 11/1996 | Klausner et al. |
| 5,590,187 | A | * | 12/1996 | Greenspan ............. 379/212.01 |
| 5,623,537 | A | | 4/1997 | Ensor et al. |
| 5,651,054 | A | | 7/1997 | Dunn et al. |
| 5,664,009 | A | | 9/1997 | Hurst et al. |
| 5,692,038 | A | | 11/1997 | Kraus et al. |

(Continued)

*Primary Examiner*—S Elahee
(74) *Attorney, Agent, or Firm*—Brinks Hofer Gilson & Lione

(57) ABSTRACT

A system and method for receiving information regarding a telephony platform and for retrieving the object of the services provided by the telephony platform corresponding to the information received. Customer premises equipment is connected to the general switched telephone network and to a supplemental service network via a central office switch. A telephony platform is connected to the general switched telephone network for providing accessory services such as voice mail, electronic mail and facsimile services. An event identifier is generated to identify a calling event. The event identifier may be attached to a message having caller identifier information. The event identifier is used if the caller is transferred to voice mail. If a voice mail message is left, an information indicator is attached to another caller identifier message that is maintained for display on the customer premises equipment to allow the user to determine which callers left messages.

20 Claims, 6 Drawing Sheets

U.S. PATENT DOCUMENTS

| | | |
|---|---|---|
| 5,706,334 A | 1/1998 | Balk et al. |
| 5,727,057 A * | 3/1998 | Emery et al. .......... 379/201.07 |
| 5,742,905 A | 4/1998 | Pepe et al. |
| 5,848,397 A | 12/1998 | Marsh et al. |
| 5,852,657 A | 12/1998 | Malik et al. |
| 5,870,549 A | 2/1999 | Bobo, II |
| 5,946,386 A * | 8/1999 | Rogers et al. .......... 379/265.09 |
| 5,960,073 A | 9/1999 | Kikinis et al. |
| 6,046,762 A | 4/2000 | Sonesh et al. |
| 6,122,357 A | 9/2000 | Farris et al. |
| 6,167,119 A | 12/2000 | Bartholomew et al. |
| 6,181,928 B1 | 1/2001 | Moon |
| 6,219,407 B1 | 4/2001 | Kanevsky et al. |
| 6,233,315 B1 | 5/2001 | Reformato et al. |
| 6,483,898 B2 | 11/2002 | Lew et al. |

* cited by examiner

SYSTEM AND METHOD FOR PROVIDING VISUAL INDICATION OF CALLER AND TELEPHONY PLATFORM INFORMATION ON CUSTOMER PREMISES EQUIPMENT

CROSS-REFERENCE TO RELATED APPLICATIONS

This application is a continuation of application Ser. No. 10/180,421, filed Jun. 26, 2002, now U.S. Pat. No. 7,020,250, which is a continuation of application Ser. No. 09/151,860, filed Sep. 11, 1998, now U.S. Pat. No. 6,483,898, wherein the entirety of each of these applications is incorporated herein by reference.

BACKGROUND OF THE INVENTION

A. Field of the Invention

The present invention relates to telecommunications services, and more particularly to a method and system for providing information about telecommunications services.

B. Background of the Invention

Telecommunications service providers offer a variety of accessory telephone services to enhance the basic capability of connecting callers on the system. Such services include messaging services, call waiting, caller identification, electronic mail (email), facsimile, etc. Users (i.e. customers of the telecommunications service providers) typically subscribe to such telephone services and use the services from a plain old telephone set. The telephone services offered by the telecommunications service providers may replace similar services offered by other sources that may require the use of special equipment.

For example, users of messaging services such as voice mail no longer need special message machines to receive and store messages. In addition, voice mail allows users to communicate audio messages in a manner similar to written communications. With voice mail systems, users receive messages in voice mailboxes that allow a user to receive, edit and forward messages to one or more mailboxes within a voice mail system.

Voice mail may be provided within a private switching system such as a private branch exchange (PBX), or it may be offered as an auxiliary service by telecommunications service providers over the general switched telephone network (GSTN). Voice mail systems operating within a PBX are private systems that are typically used only by users that work for a common organization in one or more buildings. Such private systems may require that all devices that connect to it be of selected types. One advantage of messaging services provided by telecommunications providers is that it makes voice mail available to all customers and not just to organizations or businesses using a private voice mail system. Another advantage of using messaging services provided by telecommunications providers is that many types of telecommunications devices may be used to access the services.

One problem with using messaging systems such as voice mail is that the systems lack the visual indication that message machines provide. In addition, a user may have many messages waiting to be heard at any given time. To get through all of them, the user must listen to or skip through each one sequentially. Because messages are stored in the order received, the most important messages may be separated by many unimportant messages. The voice mail systems also lack a way of searching through the messages for the most important or relevant messages. Where a telephone or voice mail is shared by several users, each user may have to listen to, or skip over messages that have been left for someone else. Currently, many voice mail systems remove any new message indications from messages that have been skipped over. Other users may not receive an indication that there are messages waiting for them. In a family, for example, message machines and voice mail services are shared by all of the members of the family. If a teenage member of the family retrieves his messages from the voice mail service, each message must be listened to or skipped over in sequence before arriving to the message directed to him. As the messages that aren't for the teenage member are listened to or skipped over, the new message indication is eliminated. Thus, the other members of the family would not know that they have messages.

It would be desirable to have a system that includes the ability to search through lists of messages and to select messages for retrieval in any order without requiring a messaging machine. It would be further desirable to have a system that allows a user to select and retrieve information regarding a telephone service.

Telephone services that provide information about the calls made to the user are available. Call waiting with name and caller identification is telephone services that provide a user with the identification or the name of callers that have attempted to call a telephone having a display. The identifications (telephone numbers or names) are left on the display until cleared by the user. One problem with the call waiting with name and caller identification services is that the information provided is limited to the name or identification of a party that tried to call the user. The caller identification services do not provide any other information such as whether a caller left a message in voice mail.

It would be desirable to have a telephone service that enhances the information provided to include information from other services. For example, it would be desirable to provide a visual indication of whether a caller left a message in voice mail.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION

A. System Overview

Figure 1:
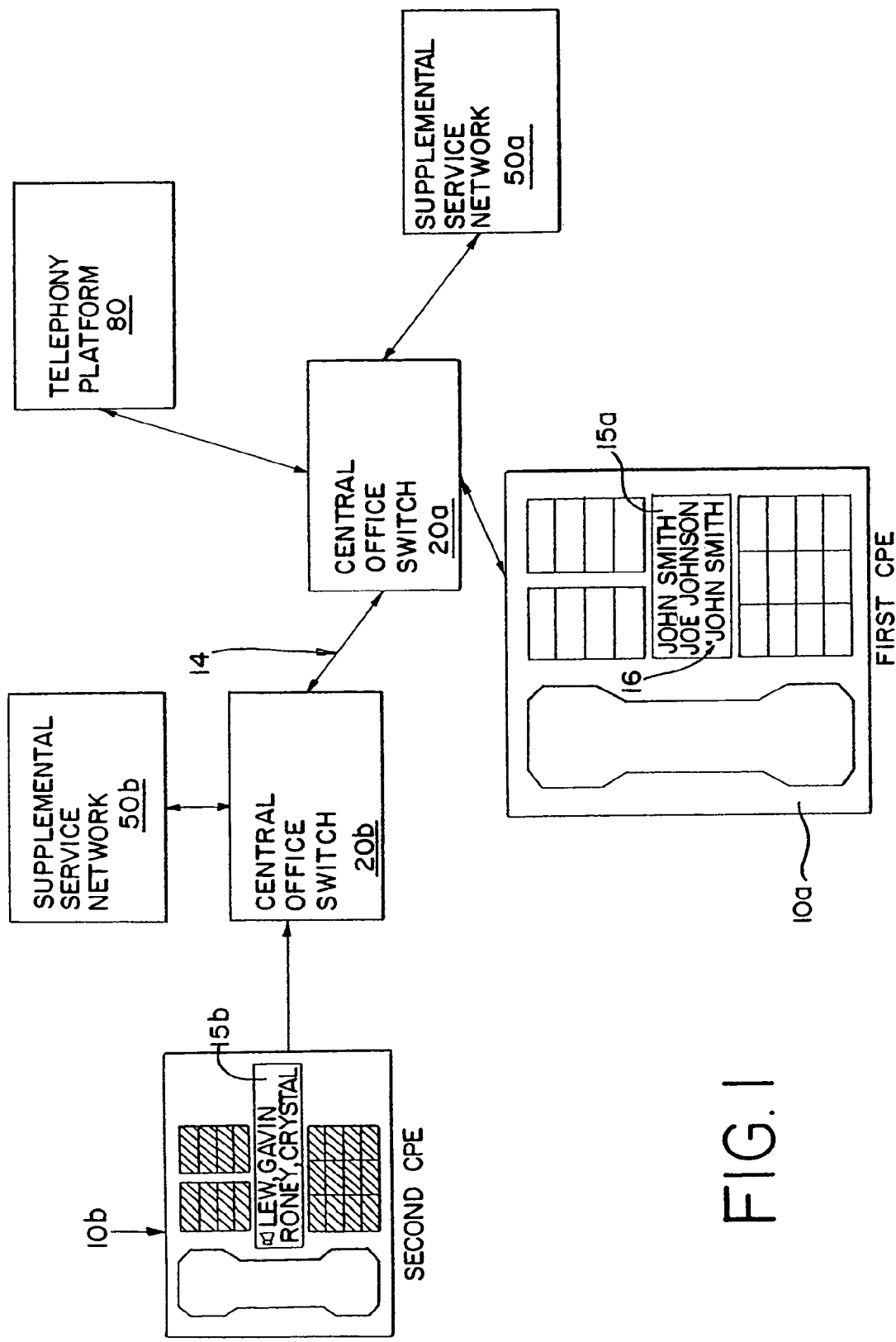
FIG. 1 is a block diagram of a telecommunications system of the type in which the present invention finds particular use.

FIG. 1 is a block diagram of a telecommunications network of the type in which the present invention finds particular use. The network in FIG. 1 includes a first Customer Premises Equipment (CPE) 10a, a second CPE 10b, a first central office switch 20a, a second central office switch 20b, first and second supplemental service networks 50a, b and a telephony platform 80. The network in FIG. 1 may be used to receive telephony platform information for a user of the first CPE 10a as telephony platform resources are used. The information is processed and maintained for easy access and display on the CPE 10a. In addition, the telephony platform services that are the objects of the information, such as voice mail messages, email or facsimiles, may be efficiently retrieved using the CPE 10a.

The central office switches 20a,b provide the CPE's 10a, b, and the telephony platform 80 with access to the general switched telephone network (GSTN). The first central office switch 20a provides call routing for the CPE 10a and other customer premises equipment in the service area in which the first central office switch 20a operates. The second central office switch 20b provides call routing services to the second CPE 10b and to other customer premises equipment in a service area in which the second central office switch 20b operates. The first central office switch 20a is connected to the second central office switch 20b, and to other central office switches via interoffice trunking systems 14. In a preferred embodiment, the interoffice trunking system 14 and the central office switches 20a,b implement a signal switching protocol to make telecommunications connections. One example of such a protocol is the Signaling System #7 (SS7) protocol.

The telephony platform 80 may provide any accessory telecommunications service that may enhance the options available to the users of telecommunications services. For example, the telephony platform 80 may include a messaging platform such as, voice mail. Other applications that may be included in a telephony platform 80 are electronic mail, facsimile, etc. A user at the first CPE 10a or at the second CPE 10b may access the services provided by the telephony platform 80 by dialing the service and connecting through the central office switch 20a.

The supplemental service networks 50a, b may be used to provide information regarding telecommunication services available to and used by the users at the first CPE 10a and the second CPE 10b, respectively. The supplemental service networks 50a, b may include an event processor and a customer information database (described below with reference to FIGS. 2-4). The supplemental service networks 50a, b receive events, or triggers which may include requests for information from the central office switches 20a, b. The event or trigger may be sensed by a pattern in a dialing sequence in the central office switches 20a,b.

The event processor performs the functions required to respond to the event and retrieves any customer information required from the customer information database. The customer information in the supplemental service network 50a, b may include basic customer usage information and information regarding the telephony services to which the user may subscribe. It is to be understood by one of skill in the art that the event processor and the customer information database may be implemented anywhere in the GSTN. In addition, it is to be understood by one of ordinary skill in the art that the connections shown between the supplemental service network 50a and 50b and the central office switches 20a and 20b, respectively, are purely for illustrative purposes. Components and functions of the supplemental service network 50a, b may be implemented anywhere in the GSTN. The central office switches 20a,b may be provided with any functions necessary for accessing the event processor and the customer information database or any other component in the supplemental service network 50a,b.

In a preferred embodiment, the supplemental service network 50a, b may include the Advanced Intelligent Network (AIN). One advantage of using the AIN is that it is widely available and used by telecommunications service providers. The AIN is also well suited for use in a multi-vendor environment in which equipment may be manufactured and used by different vendors. In other embodiments, a switched-based network may be used in which the functions of the supplementary service network 50a,b are performed in a local switch.

The CPE 10a and the CPE 10b may include any telecommunications device that communicates via the GSTN. The CPE 10a is preferably a telephone having a display device 15a. The display device 15a provides information about the telecommunications services that are used by the user. One advantage of the present invention is that the display device 15a may be used to display a first message and a second message. The first message includes a caller-identifier, which may include the name of a caller that attempted to place a call to the CPE 10a. The second event message may be an information indicator 16 that identifies any caller that left a message in voice mail. For example, the information indicator 16 may be an asterisk or other mark or icon placed next to the identifier of a caller in the list in the display device 15b to indicate that the caller left a message in the user's voice mail. Another advantage of the present invention is that the information indicator 16 may be used to provide information about a call that relates to any other accessory telephone service available to the user of the first CPE 10a. For example, the information indicator 16 may be used to inform the user that the corresponding caller left a fax or an email in the mailbox. One of ordinary skill in the art will understand that the CPE 10a may attach to a computer or a facsimile machine.

The CPE 10b may also include a display device 15b and the information indicator 16.

The CPE's 10a, b may also include special function keys that combine with the display devices 15a, b to provide additional features. A scroll key may be provided to allow user to scroll through the list of caller identifiers listed in the display device. Another key may be provided to allow the user to connect to the voice mail system with a request for a specific message. The voice mail system may retrieve a message left by the caller identified by a selector in the display device.

One advantage of the CPE 10a is that it includes an enter key (discussed below) for highlighting and selecting entries in the list on the display device, and a retrieve key (discussed below) for initiating a retrieval of the services indicated by the entry. For example, the user may enable several different entries by scrolling through the entries indicating that voice mail messages were left, highlighting and selecting the entries by hitting the Enter key, and initiating a retrieval of the voice mail messages by hitting the Retrieve key.

B. Receiving Telephony Platform Information

Figure 2A:
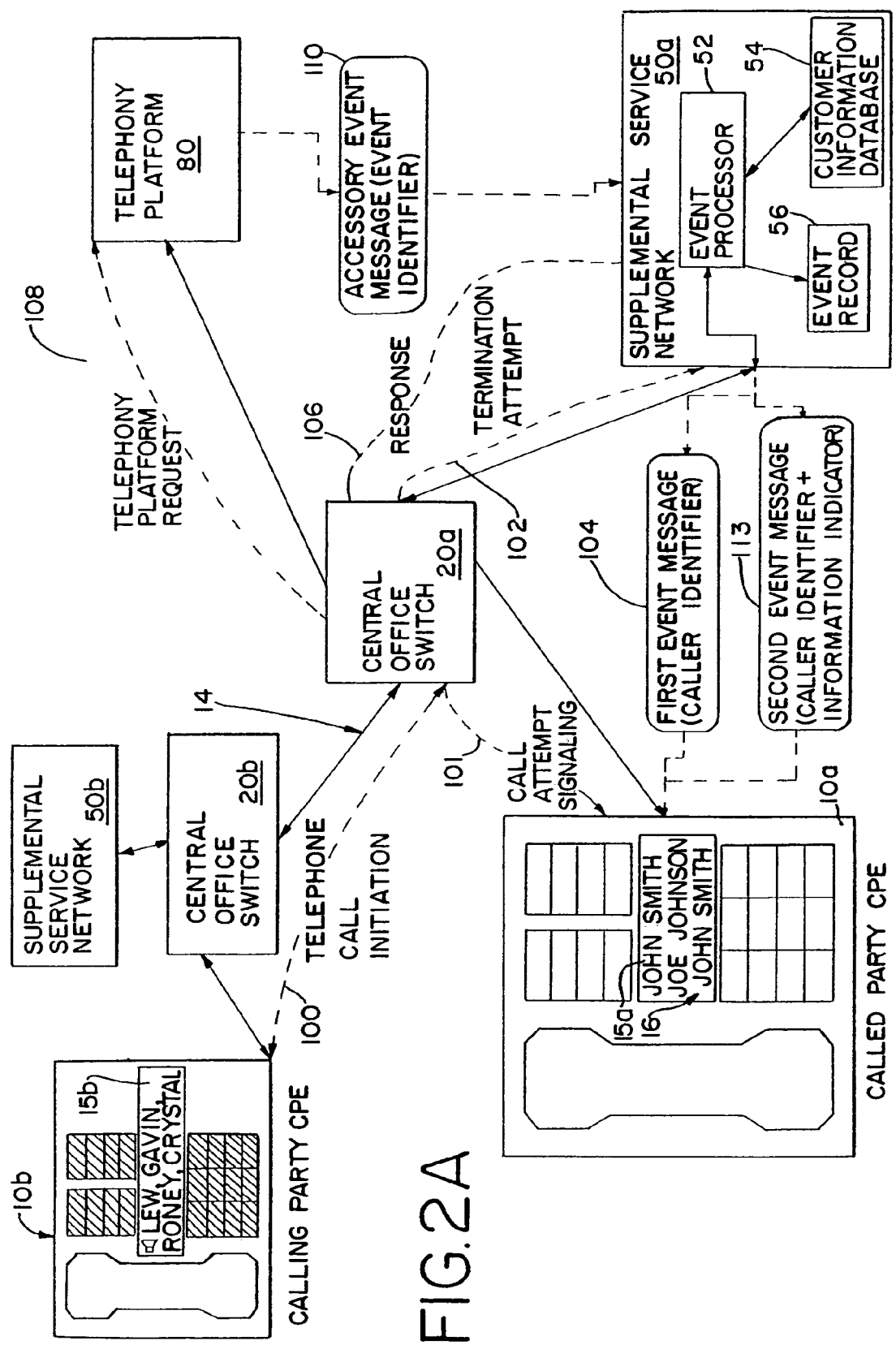
FIG. 2A shows examples of connections for communicating information-receiving events in the telecommunications system in FIG. 1.

The block diagram in FIG. 2A shows the telecommunications network of FIG. 1 and examples of connections and messages for receiving telephony platform information according to a preferred embodiment of the present invention. In the block diagram in FIG. 2A, the flow of messages and events relate to an attempt by the second CPE 10b (hereinafter "calling party") to make a telephone connection, or a telephone call to the first CPE 10a (hereinafter the "called party"). In the example described below, the call made is a voice call by a calling party using the calling party CPE 10b. One of ordinary skill in the art will understand that any type of telecommunications connection over the GSTN may be used and that any type of accessory service may be used as well.

The supplemental service network 50a includes a customer information database 54 for storing customer identifiers, or data base elements containing information about customers. The customer identifiers may be used as a called party identifier that may further include the name of the called party and the telephone number of the called party CPE 10a.

In addition, the configuration of central office switches 20a,b in FIG. 2 is one illustrative example of how communication between the CPE's 10a, b, the supplemental service network 50a, b, and the telephony platform 80 may be accomplished. Other examples are possible. For example, the CPE's 10a, b may connect to supplemental service network 50 components via another central office switch 20.

In the example in FIG. 2, the calling party initiates a call by picking up the receiver set on the calling party CPE 10b and dialing the called party telephone number causing a telephone call initiation 100. When the second central office switch 20b receives the telephone call initiation 100, it completes the connection to the called party CPE 10a which signals to the called party that an telephone call has been initiated.

During the telephone call initiation 100, at the central office switch 20a, a termination attempt trigger 102 occurs. The call is then suspended pending information from the supplemental service network 50a. The supplemental service network 50a receives the termination attempt trigger 102 at the event processor 52 along with information about the connection being attempted. The connection information may include the calling party telephone number, the calling party name, the called party telephone number and the called party name.

The event processor 52 uses the connection information to obtain customer information about the called party at the called party CPE 10a from the customer information database 54. The customer information may include supplemental service instructions to the central office switch 20a during an attempted call to the called party CPE 10a. The event processor 52 also creates and stores an event record 56 having a calling party telephone number, a called party telephone number, the time of the termination attempt and an event identifier.

The event processor 52 may carry out t he supplemental service instructions or return the instructions to the central office switch 20a in a response 106 message. The response message 106 may be a message that responds to any request for information at the supplemental service network 50a. The central office switch 20a sends a call attempt signal 101 to annunciate a call to the CPE 10a and the CPE 10a signals the user by ringing, or other means. The central office switch 20a may carry out instructions that may require a GSTN connection such as call forwarding to another telephone or to a voice mail system. The instructions may also include simple tasks such as sending a message to the CPE 10a during the call attempt signaling 101. For example, the called party 10a may subscribe to, or use a feature known in the art as Caller Identification, or Caller ID. The caller ID service provides the called party with the identification of the caller attempting the call. The identification of the caller may be in the form of a text string identifying the caller by name, for example, or the identification may be the calling party telephone number. The identification of the caller and any other information about the calling party may be retrieved from the supplemental service network 50b that serves the calling party.

The event processor 52 sends a first event message 104 to the called party CPE 10a to provide the information regarding the termination attempt. The first event message 104 includes the calling party identifier and the calling party telephone number. The first event message 104 may also include the event identifier. The called party CPE 10a receives the first event message 104 and displays the identification of the caller on the display device 15a of the called party CPE 10a during the signaling of the attempted call (e.g. during ringing). The information carried in the first event message 104 is retained to inform the called party of the termination attempt while the CPE 10a is ringing. The display that informs the called party is described below with reference to FIGS. 3 and 4.

The central office switch 20a sends a third event message, or a telephony platform request 108 to the telephony platform 80, which may include a voice mail service. The telephony platform request 108 includes the calling party telephone number, the called party telephone number, the time and the event identifier in the event record 56 for the termination attempt 102. During the telephony platform request 108, the calling party CPE 10b is connected to the voice mail service on the telephony platform 80 over the necessary GSTN connections (e.g. via the first central office switch 20a, or via other central office switches to which the telephony platform may connect).

During the connection to the telephony platform 80, the calling party at the calling party CPE 10b either leaves a voice mail message for the called party, or terminates the connection. If the calling party terminates the connection by hanging up the CPE 10b before leaving a message, the event record 56 is retained in the customer information database 56.

If, however, the calling party leaves a voice mail message for the called party, the telephony platform 80 sends an accessory event message 110 indicating the calling party telephone number, the called party telephone number, the time of the message and the accessory event identifier. The accessory event message 110 is preferably communicated over a connection that is made between the telephony platform 80 and the supplementary service network 50a. The connection is made using X.25, TCP/IP or any other suitable protocol that facilitates communication between two network elements. The event identifier in the accessory event message 110 may be the same as the original event identifier created for the termination attempt to provide a way of matching messages with telephony events.

The event processor 52 in the supplemental service network 50a receives the accessory event message 110 and compares the event identifier in the accessory event message 110 with the event identifier in the event record 56. If a match is found, the event processor 52 sends a second event message 112 to the called party CPE 10a. The second event message 112 includes the calling party identifier and the information indicator 16. The information indicator 16 provides a visual indication that a voice mail message corresponding to the caller identified in the display was left by the calling party. One advantage of the embodiment in which the event processor 52 determines the correlation between the different event identifiers is that it eliminates the need for the CPE to have the capability of processing the event identifiers. The advantages of the present invention may be used with CPEs that have the display for the caller ID with name service.

In an alternative embodiment, the event processor 52 sends the second event message with the event identifier. The called party CPE 10a receives the message 112 and compares the event identifier to determine if it relates to a previously received message. If the event identifier relates to a previously received message, the information indicator 16 is attached to the calling party identifier of the calling party corresponding to the event identifier of the second event message 112. One advantage of sending the event identifier to the called party CPE 10a for processing is that it distributes the processing of the information to the CPE's. This may provide some flexibility in the manner in which the information is displayed or handled by the CPE.

The block diagram of FIG. 2A and the messages and connections shown may be varied according to special situations. For example, the supplemental service instructions on the response 106 may include contingency instructions for the central office switch 20a. The contingency instructions may include instructions to follow in case the called party has requested that calls to the called party CPE 10a be re-directed (e.g. call forwarding). Another example of call forwarding is to connect the calling party to a voice mail service or to forward the call directly to voice mail without signaling the call to the called party CPE 10a. Call attempts that are forwarded to a different CPE 10a or to voice mail may be handled in the same manner as described except that the actual attempt to connect to the CPE 10a is never made.

C. Retrieving Telephony Platform Services

Figure 2B:
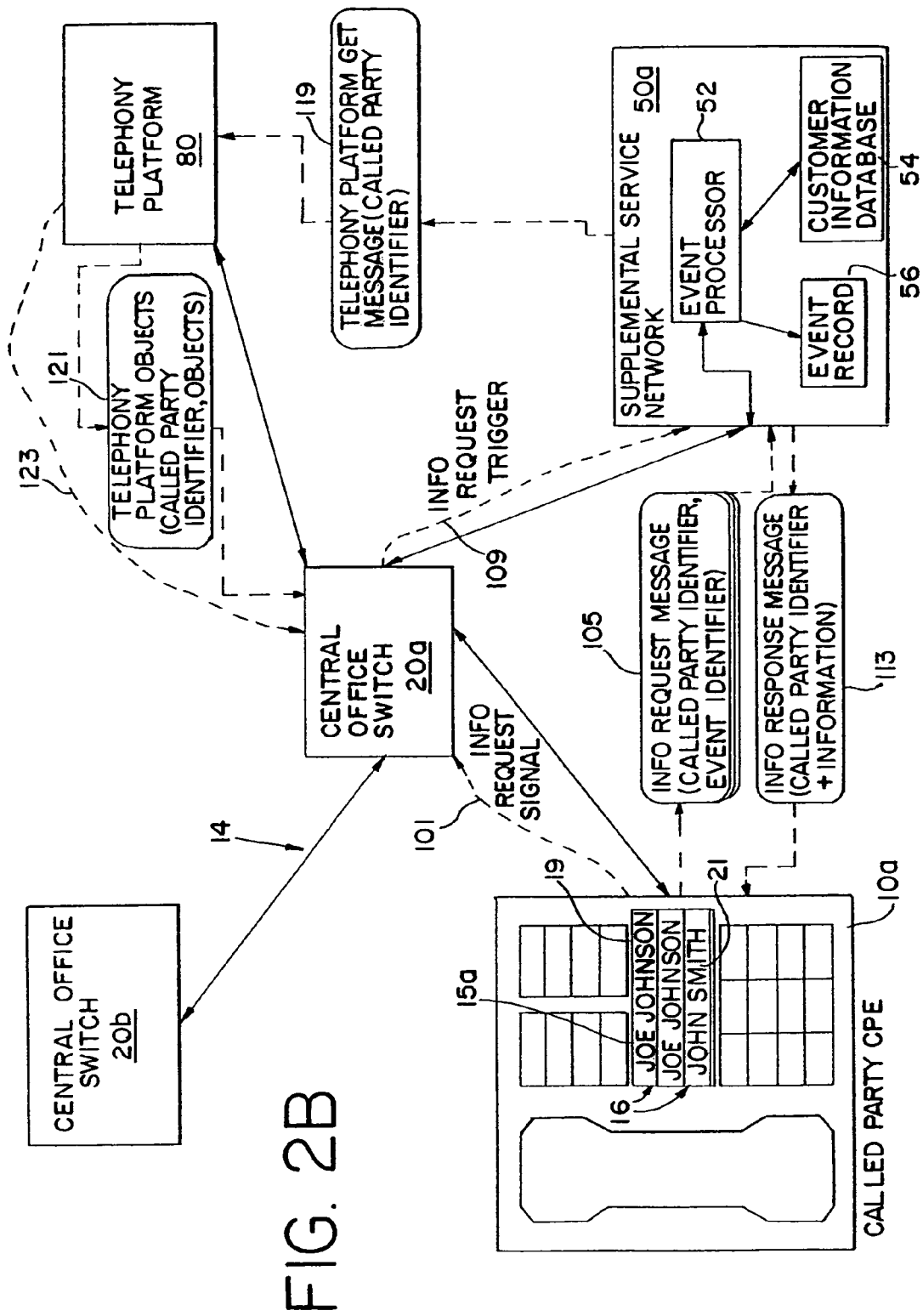
FIG. 2B shows examples of connections for communicating information-retrieving events in the telecommunications system in FIG. 1.

The block diagram in FIG. 2B shows the telecommunications network of FIG. 1 and examples of connections and messages for retrieving the objects of the telephony platform services according to a preferred embodiment of the present invention. In the block diagram in FIG. 2B, the flow of messages and events relate to the retrieval of objects of the services provided by the telephony platform 80. In the example described below, the object is a voice mail message left from an attempted voice call by a calling party using the calling party CPE 10b. One of ordinary skill in the art will understand that any type of accessory service may be used as well.

In the block diagram of FIG. 2B, the display device 15a of the CPE 10a includes a list of the callers that had attempted to call the called party CPE 10a with visual indicators 16 left next to the callers that left voice mail messages. The user of the CPE 10a may use the scroll keys on the CPE 10a to scroll through the list to identify messages that are the more urgent callers, or if the user shares the use of the CPE 10a with others, the user may scroll through the list to identify his or her calls.

In a preferred embodiment of the present invention, the user may scroll through the list and select more than one entry in the list and, with one press of a key, make a request for the retrieval of all of the objects associated with each entry. The request may include different types objects. For example, in one request, a user may retrieve more than one mail message, email message and facsimile.

The user may scroll through and select multiple entries such as a first entry 19 and a second entry 21. When all of the desired entries have been highlighted (as in the first entry 19) and selected, the user may press a retrieve key, or a get key to retrieve the objects of the entries, which in the example below is voice mail messages. The CPE 10a prepares and sends information request messages 105 to the supplemental service network 50a for each entry selected. The information request message 105 may include the calling party identifier and the event identifier.

The supplemental service network 50a receives the information request messages 105 and connects to the telephony platform 80 over an ISDN, TCP/IP or other suitable connection. The supplemental service network 50a communicates a telephony platform retrieve message 119 to request the voice mail message (or email, or facsimile) identified by the calling party identifier, although the event identifier may also be used. In a preferred embodiment, a separate telephony platform retrieve message 119 is sent for each information request message 105 received from the CPE 10a. Alternatively, the supplemental service network 50a may package multiple requests from multiple information request messages 105 in one telephony platform retrieve message 119.

The telephony platform 80 responds to the telephony platform retrieve message 119 by connecting to the CPE 10a via a switch-based connection 123. The supplemental service network 50a may include an agent to facilitate the connection to the CPE 10a by the telephony platform 80. In a preferred embodiment (described below), the supplemental service network 50a is an Advanced Intelligent Network (AIN) using a Service Node/Intelligent Peripheral (SN/IP) as an agent to connect the telephony platform 80 to the CPE 10a. The telephony platform 80 then sends a telephony platform object message 121 to the CPE 10a. The telephony platform object message 121 is the voice mail message or other service performed by the telephony platform 80. The voice mail message in the telephony platform object message may be played to the user upon receipt at the CPE 10a, or it may be stored in the CPE 10a along with other messages for later use. An email message may be displayed on the display device 15a, or it may be stored for later display or for sending to a personal computer or handheld computer. Facsimiles may be delivered and directed to a suitable output device (not shown), or stored for later use.

D. Systems for Providing Telephony Platform Information

Figure 3:
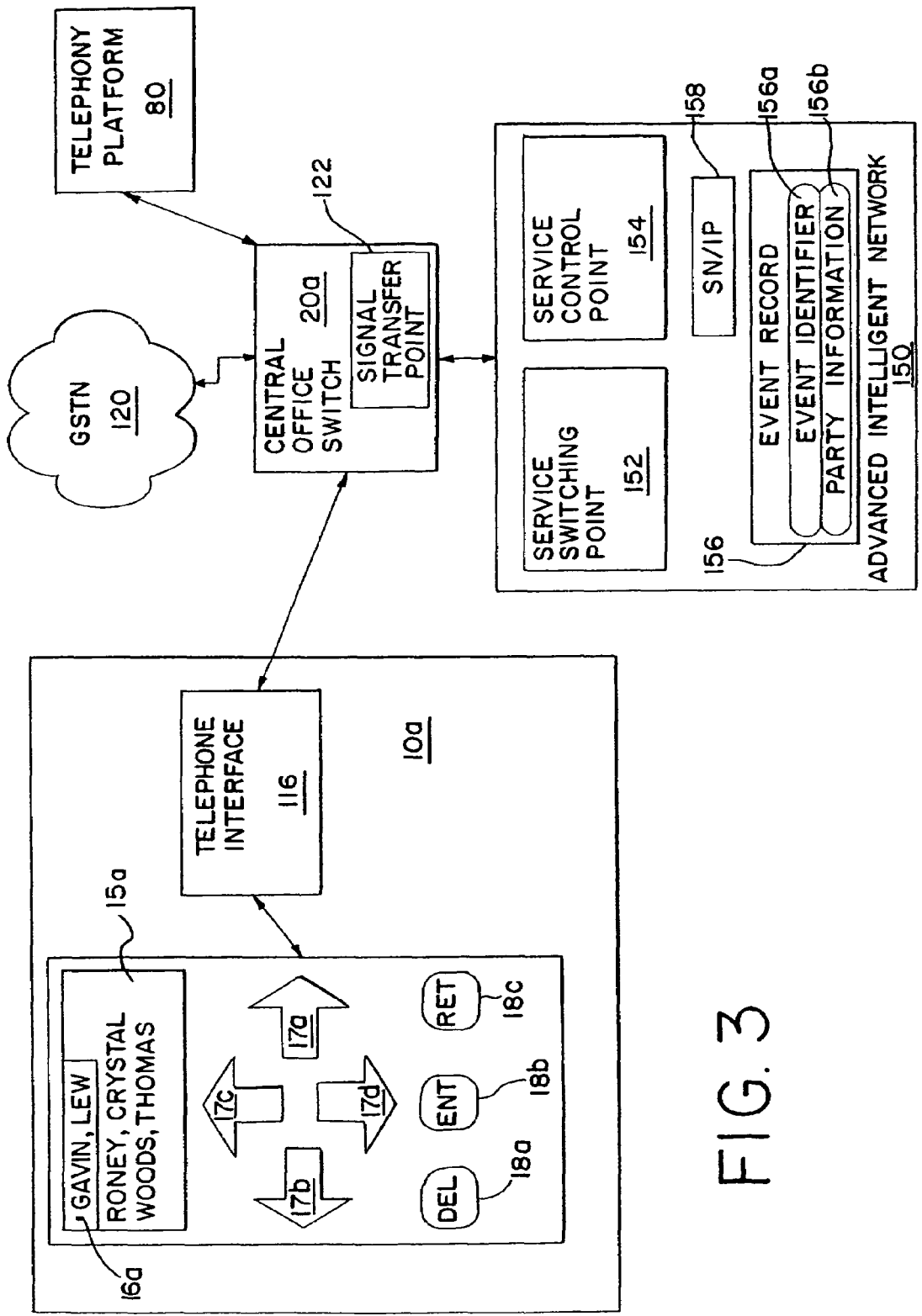
FIG. 3 is a block diagram of the customer premises equipment of FIG. 1 according to one embodiment of the present invention.
Figure 4:
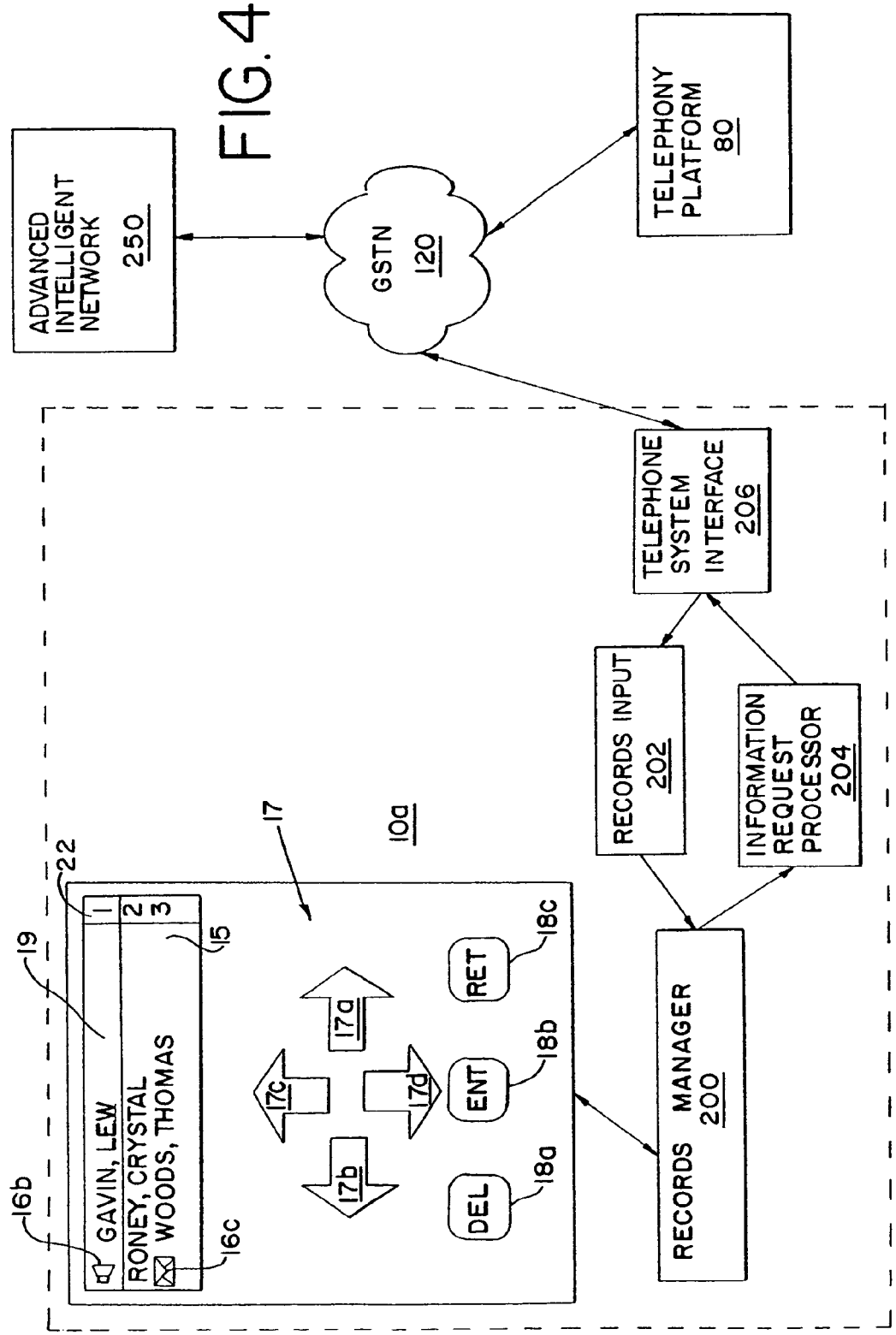
FIG. 4 is a block diagram of the customer premises equipment of FIG. 1 according to an alternative embodiment of the present invention.

Examples of systems for receiving information about telephony platform resources and for retrieving the telephony platform resources are illustrated in FIGS. 3 and 4. FIG. 3 shows a block diagram of the CPE 10a of FIG. 1 according to a preferred embodiment of the present invention. The CPE 10a in FIG. 3 is a telephone with a display for displaying caller identifier information as part of the caller identifier (Caller ID) service provided by telecommunications service providers. The CPE 10a in FIG. 4 includes the display device 15, scroll keys 17a-d, a delete key 18a, an enter key 18b, the delete key 18a and the retrieve key 18c provide the user with the ability to scroll through the lines in the display. These keys and function are described further with reference to FIG. 4.

The CPE 10a connects to the central office switch 20a via the telephone system interface 116. The telephone system interface 116 includes the hardware and software structure for communicating with the central office switch 20a. For example, the telephone system interface 116 may include the hardware and software that inputs and outputs telephony signals that carry dialing, call setup and call information. The telephone system interface 116 may input and output signals to the telephone transmitter and receiver set (not shown) and to a ringer (not shown). The telephone system interface 116 is well known in the art and therefore requires no further description.

In a preferred embodiment, the supplemental service network 50 includes the Advanced Intelligent Network (AIN) 150. The AIN 150 receives event messages from the central office switch 20a that connects the AIN 150 to the GSTN 120 using a signal transfer point 122. The AIN 150 also includes a service node/intelligent peripheral (SN/IP) 157 for creating switch-based connections that may be a part of a service performed by the AIN 150.

The service control point 154 analyzes the number sequences when a number is dialed to the central office switch and forms event messages. The event messages are sent to the AIN 150 to determine whether the called party uses accessory services and, if so, the instructions that are to be followed in accordance with the accessory services.

The AIN 150 includes a service switching point 152 and a service control point 154. The service switching point 152 may include the event processor 52 discussed above with reference to FIGS. 1 and 2. The service control point 154 may include the customer information database described above with reference to FIGS. 1 and 2.

The AIN 150 may also include an AIN event record 156, which may include an AIN event identifier 156a and party information 156b. The AIN event identifier 156a may be a number, a string of alphanumeric characters, or any other symbol that may be used to identify telecommunications events. The AIN 150 may create the AIN event identifier 156a anytime an AIN event message, or a trigger is received from the signal transfer point 122.

The party information 156b may include the calling party telephone number, the calling party identifier, the called party identifier and the called party telephone number. The party information 156b preferably includes the calling party identifier in text string format to provide the string for the caller identifier message service. If a voice mail message is left (or if a fax is transmitted, or if an email is left, etc.) after an attempt to place a telephone call, the calling party identifier may include the information indicator (described with reference to FIG. 2A) in the text string. Alternatively, the information indicator may be inserted or appended when the switching service processor is preparing is to send the second event message 112.

It is to be understood by one of ordinary skill in the art that the event record 156 may be included in any suitable component. For example, the event record 156 may be included in the service control point 154, or in a separate database component of the AIN 150. In addition, one of ordinary skill in the art will appreciate that the structure illustrated in FIG. 3 is shown as an example and is not intended to limit the organization of the data elements managed by the AIN 150.

In example embodiment, the service switching processor 152 analyzes event messages to determine if additional information may be provided to the user. The service switching processor 152 generates event identifiers and analyzes event identifiers in the messages it receives. The service switching processor 152 also sends the second event message 112 (shown in FIG. 2) with the information that is to be displayed on the display device 15a of the CPE 10a. An example of the second event message 112 that may be sent by the AIN 150 in FIG. 3 to the CPE 10a is shown in Table 1.

| Parameter | Example |
|---|---|
| Calling party identifier | "*Gavin Lew" |
| Calling party telephone number | "999-555-0000" |
| Event Identifier | 01 |

The CPE 10a receives the second event message 112 at the telephone interface 116 and may display the calling party identifier, the calling party telephone number or both. The calling party identifier in Table 1 includes an information indicator 16a, for example an asterisk (*), to indicate that the calling party left a voice mail message when it was connected to voice mail.

In one presently preferred embodiment, the AIN 150 communicates the calling party name or telephone number to the CPE 10a in a 15-character string when performing caller ID with name functions. The 15-character string may be used to carry the event identifier. For example, the event identifier may be the $15^{th}$ character in the string. The advantage of setting the event identifier as part of the 15-character string is that only the AIN 150 may be setting and checking the event identifier to determine whether events correlate with each other. The AIN 150 may therefore be the only component in the network in FIG. 3 that needs to be modified from a caller identifier with name system to perform the receiving and retrieving methods discussed with reference to FIGS. 2A & 2B.

One advantage of using the AIN 150 in FIG. 3 is that the CPE 10a is spared the need to perform any special processing. Any known telephone that is capable of performing the caller identifier service may be used in the system in FIG. 3.

The block diagram of FIG. 4 shows hardware and software structure in the CPE 10a for providing the user with information regarding the telephone services and for selectively requesting information from the telephone services. The CPE 10a in FIG. 4 includes the display device 15, scroll keys 17a-d, an enter key 18b, a delete key 18a, a records manager 200, a records input 202, an information processor 204 and telephone system interface 206. The CPE 10a connects to the central office switch 20a via the telephone system interface 206 as described above with reference to FIG. 3.

Information regarding the services to which the CPE 10a subscribes may be maintained in an advanced intelligent network AIN 250. The AIN 250 may be accessed through the central office switch 20a. The user of the CPE 10a may access telephony services from the telephony platform 80 via the interoffice trunking system 14. In the description that follows, the telephony platform 80 is a voice mail system. However, preferred embodiments of the present invention may include other telephony platforms 80 such as facsimile services and electronic mail.

The AIN 250 in FIG. 4 may include the same components as the AIN 150 shown in FIG. 3. However, the AIN 250 in FIG. 4 does not determine whether the second event message 112 includes the information indicator 16. The AIN 250 receives the accessory event message from the telephony platform 80 and sends the same event identifier in the accessory event message in the second event message 112.

The CPE 10a includes hardware and software structure for comparing the event identifier in the messages it receives and for creating visual indicators for the display 15 on the CPE 10a. When a calling party calls the user at the CPE 10a, the central office switch 20a may query the AIN 250 for information using the termination attempt trigger 102. The AIN 250 may respond by creating the event record 52 (shown in FIG. 2) and assigning the event identifier to the call initiation attempt event. The event identifier is then used in the first event message 104, telephony platform request 108, the accessory event message 110 and the second event message 112. The CPE 10a receives the first event message 104 and the second event message 112 and attaches the information indicator 16 if the event identifier in the two messages is the same.

The CPE 10a includes hardware and software structure for analyzing the event messages. The CPE 10a receives the signals for initiating a telephone connection and signals a call to the user by well-known signaling techniques such as ringing. Once the AIN 250 sends the first event message, the records input 202 receives the first event message 104 and creates a record of the call. The record may include caller identifier information such as the name and/or telephone number of the calling party, the time of the call, the date of the call, etc. The record may also include the event identifier 22.

Figure 5:
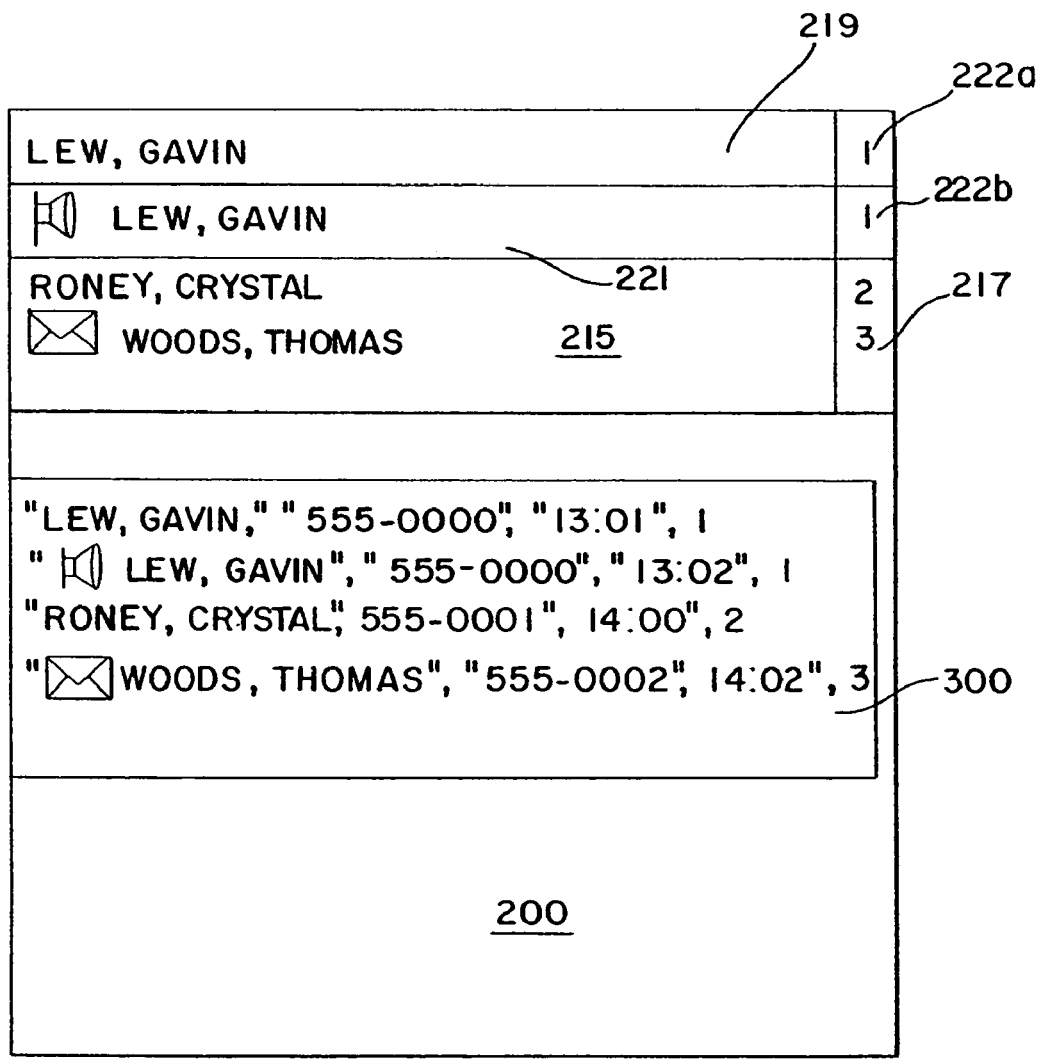
FIG. 5 is a block diagram of the record manager in the customer premises equipment of FIG. 4 according to an alternative embodiment of the present invention.

FIG. 5 shows a block diagram of the records manager 200 in a preferred embodiment. The records manager 200 includes a display area 215 and a records area 300. The display area 215 includes data structures for storing text strings according to how the records will appear in the display device 15. The display area 215 in FIG. 5 includes a first entry 219 and a second entry 221 from a caller named Gavin Lew. The entries 219, 222 include the event identifier 222a, b, which may or may not be displayed in an event identifier area 217. The records manager 200 determines whether the information indicator 16 is to be displayed by determining if the second event message event identifier 222b matches another event identifier, such as the first event message event identifier 222b.

The display area 215 receives data for display from the records area 300. The records area 300 includes data structures for storing the information received in the event messages. It is to be understood by one of ordinary skill in the art that the block diagram in FIG. 5 is purely illustrative and is in no way intended to limit the structure of the data stored in the CPE 10a.

Referring back to FIG. 4, the second event messages 112 are received at the records input 202 and sent to the records manager 200. The records manager 200 checks the event identifier in the second event message 112 to determine if it matches a previously received event message. The records manager 200 signals that a voice mail message was left by attaching a visual indicator 16 next to the caller identification that identifies the caller that left the message. The visual indicator 16 shown in FIG. 2 is an envelope to indicate a mail message; however, any suitable visual indicator may be used.

The records manager 200 maintains records of calls which are displayed on the display device 15 as shown in FIG. 5. In FIG. 4, a selector 19 in the display device may be provided and controlled using scroll keys 17a-d. The user presses the scroll keys to move the selector 19 from one record to another. By moving the selector 19 to a record, the user may obtain further information about the record. For example, the user may scroll the selector 19 to a record having the visual indicator 16. By pressing the enter key 18b, the user may select the record for information retrieval. The user may continue to select other records by moving the selector 19 to records and pressing the enter key 18b. By hitting the retrieve key 18c, the records selected by the user are processed by the records manager 200.

In a preferred embodiment, the retrieve key 18c signals the records manager 200 to begin a request for information from the telephony platform 80 by creating telephony platform retrieve messages 105 (in FIG. 2B). The records manager 200 signals the request to the information request processor 204. The information request processor formats a communication containing the telephony platform retrieve messages 105 to the telephony platform 80. The telephony platform retrieve messages 105 formatted by the information request processor 204 includes information necessary for retrieving a message from the voice mail system at the telephony platform 80. The communication may include, for example, the telephone number of the voice mail system, an access code for the user at CPE 10a, and the message identifier for retrieving the selected message.

In a preferred embodiment, the communication is sent to the AIN 250 where it is processed by the SN/IP 157. The SN/IP 157 initiates a connection from the telephony platform to the CPE 10a to provide the voice mail message or messages to the user.

In an alternative embodiment, the CPE 10a initiates a connection to the telephony platform 80 without involving the AIN 250. For example, one format for the communication may include a series of DTMF signals that would mimic the key press sequence that the user would press if the user were attempting to access voice mail using the keypad in conventional manner. The voice mail in the telephony platform 80 receives the communication from the CPE 10a and performs the voice mail request indicated in the communication. The voice mail system retrieves the message identified by the unique message identifier and transmits it to the CPE 10a. The CPE 10a receives the message at the telephone system interface 206 and may output the message using known techniques. For example, the message may be output as audio through the telephone receiver set.

One advantage of the CPE 10a shown in FIG. 4 is that the user of the CPE 10a may scroll through a list of records and selectively request information about the records. The CPE 10a is particularly advantageous in an environment in which the CPE 10a is used for a voice mail service that is shared by a number of users. Each of the users may scroll through the list of calls and identify the ones that were most likely left for them. The user may listen to his or her message and leave other messages for other users. For example, in a family in which several teenagers and the parents share the voice mail service, a teenager may come home and scroll through the display device to find callers that likely called for her. The teenager can then select and retrieve only the messages left for her without having to listen to any other messages that may have been left for anyone else in the family. The teenager will not need to be concerned with taking messages or erasing anyone else's messages.

The descriptions of the above embodiments were primarily based on using a voice mail system as the telephony platform 80. Other types of systems and resources may also be used. For example, the telephony platform 80 may be an email server to which a "calling party" or email sender directs an email intended for the called party. The email may be intended for display on the CPE 10a, a personal computer or a handheld computer. The process for receiving the information indicator 16 to show that an email from the email sender is waiting for the user may be similar to the process described with reference to FIG. 2A. One of ordinary skill in the are will appreciate that the sending of an email precludes the need for any signals such as the termination attempt trigger that have the purpose of notifying the user that a connection is being attempted. Such steps include the termination attempt trigger, the sending of the first event message to the CPE 10a, etc. The retrieval of the email message may be similar to the process described with reference to FIG. 2B if the message is to be displayed on the CPE 10a display device 15a.

In addition, the telephony platform service may also be a facsimile server. The facsimile server may operate in the same way as a telephone call with a message to voice mail, except that during retrieval, an image is displayed on the display device, or output to a different output device in a manner that is known to one of ordinary skill in the art.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

We claim:

1. A method for providing information via a messaging service operative on a telephony network, the method comprising:

receiving a call notification at a supplemental service network configured to provide the messaging service, the call notification comprising calling party information and called party information;

generating an event record at the supplemental service network in response to the call notification, the event record comprising the calling party information, the called party information and a first event identifier;

transmitting a first event message to a called party customer premises equipment (CPE) configured for cooperation with the telephony network and associated with the called party information, the first event message comprising at least a portion of the calling party information;

receiving accessory event information of the call at the supplemental service network from an accessory telephone service;

generating a second event message that supplements the first event message, wherein the second event message comprises at least a portion of the calling party information and an information indicator; and transmitting the second event message to the called party CPE.

2. The method of claim 1 further comprising determining if the accessory event information relates to the first event identifier.

3. The method of claim 2, wherein generating the second event message further comprises generating the second event message if the accessory event information relates to the first event identifier.

4. The method of claim 1, wherein the calling party information comprises a telephone number and a name of the calling party.

5. The method of claim 1, wherein the called party information comprises a telephone number of the called party.

6. The method of claim 1, further comprising determining if a customer information database in the supplemental service network contains supplemental service instructions for the called party.

7. A supplemental service network for supporting a messaging service in communication with a telephony network, the supplemental service network comprising:

an input configured for cooperation with a telephony network, the input configured for communicating with a switch;

a customer information database;

an event processor configured for cooperation with the messaging service, the event processor in communication with the customer information database and the input, the event processor comprising instructions for executing the steps of:

generating an event record in response to receipt of a call notification of a call to a customer via the input and storing the event record in the customer information database;

transmitting a first event message to a customer premises equipment (CPE) of the customer, the first event message comprising information regarding a calling party for the call to the customer;

receiving accessory event information of the call from an accessory telephone service and determining if the accessory event information relates to the call to the customer; and transmitting a second event message to the CPE of the customer if the accessory event information relates to the call for supplementing the first event message, and comprises an identification of the calling party and an information indicator.

8. The supplemental service network of claim 7, wherein the customer information database comprises supplemental service instructions associated with the customer.

9. The supplemental service network of claim 7, wherein the event record comprises an event identifier for identifying a telecommunications event.

10. The supplemental service network of claim 9, wherein the event identifier comprises one of a number or a string of alphanumeric characters.

11. The supplemental service network of claim 7, wherein the accessory telephone service comprises a voicemail service and the accessory event information comprises an indication that a voicemail message has been left for the customer.

12. The supplemental service network of claim 11, wherein the information indicator of the second event message comprises information for generating a visual indicator at the CPE of the customer.

13. The supplemental service network of claim 7, wherein the second event message comprises the information indicator appended as a suffix to the identification of the calling party.

14. The supplemental service network of claim 7, wherein the second event message comprises the information indicator appended as a prefix to the identification of the calling party.

15. The supplemental service network of claim 7, wherein the information indicator comprises a symbol, a mark, or an alphanumeric character.

16. The supplemental service network of claim 7, wherein the supplemental service network comprises an advanced intelligent network (AIN) and wherein the switch comprises a central office switch.

17. A supplemental service network for supporting a messaging service in a telephony network, the supplemental service network comprising:

means for receiving a call notification, the call notification comprising calling party information and called party information;

means for generating, at the messaging service, an event record in response to the call notification, the event record comprising the calling party information, the called party information and a first event identifier;

means for transmitting a first event message to a called party customer premises equipment (CPE) associated with the called party information, the first event message comprising at least a portion of the calling party information;

means for receiving accessory event information of the call from an accessory telephone service and determining if the accessory event information relates to the first event identifier;

means for generating a second event message if the accessory event information relates to the first event identifier, wherein the second event message that supplements the first event message and comprises the identification of the calling party and an information indicator; and means for transmitting, via the telephony network, the second event message to the called party.

18. The supplemental service network of claim 17, wherein the accessory telephone service comprises a voicemail service and the accessory event information comprises an indication that a voicemail message has been left for the called party.

19. The supplemental service network of claim 18, wherein the means for generating a second event identifier comprises means for generating information for display of a visual indicator at the called party CPE.

20. The supplemental service network of claim 17, wherein the information indicator comprises an indication of a type of message in the accessory telephony service.

* * * * *